United States Patent [19]

Kozawa

[11] 4,285,122
[45] Aug. 25, 1981

[54] HEAT-TREATED, ORGANIC SOLVENT-TREATED MANGANESE DIOXIDE

[75] Inventor: Akiya Kozawa, Middleburg Heights, Ohio

[73] Assignee: Union Carbide Corporation, New York, N.Y.

[21] Appl. No.: 130,241

[22] Filed: Mar. 14, 1980

[51] Int. Cl.³ .............................................. H01M 6/16
[52] U.S. Cl. .................................................. 29/623.1
[58] Field of Search .................. 429/224, 194, 195, 48; 29/623.5, 623.1

[56] References Cited

U.S. PATENT DOCUMENTS

| 3,415,687 | 12/1968 | Methlie | 429/195 |
| 4,133,856 | 1/1979 | Ikeda et al. | 429/224 |
| 4,197,366 | 4/1980 | Tamura et al. | 429/224 |

FOREIGN PATENT DOCUMENTS

| 51-2934 | 1/1976 | Japan . |
| 52-62625 | 5/1977 | Japan . |
| 52-73328 | 6/1977 | Japan . |
| J5 4046-341 | 9/1977 | Japan . |
| 1199426 | 7/1970 | United Kingdom . |

Primary Examiner—Donald L. Walton
Attorney, Agent, or Firm—Cornelius F. O'Brien

[57] ABSTRACT

A homogeneous mass of particulate manganese dioxide which has been heat-treated to reduce its moisture content and treated with an organic solvent which substantially fills the pores of the manganese dioxide thereby reducing its affinity for absorbing moisture when exposed to a moisture environment for a fixed time period. The invention also relates to a process for producing the manganese dioxide.

5 Claims, No Drawings

HEAT-TREATED, ORGANIC SOLVENT-TREATED MANGANESE DIOXIDE

FIELD OF THE INVENTION

The invention relates to a homogeneous mass of particulate manganese dioxide for use in electrochemical cells in which the pores of the manganese dioxide are substantially filled with an organic solvent so as to minimize moisture absorption by the manganese dioxide when exposed to a moisture environment for a fixed time period. The invention also relates to an organic solvent treatment of manganese dioxide and an electrode employing such treated manganese dioxide.

BACKGROUND OF THE INVENTION

The development of high energy battery systems requires the compatibility of an electrolyte possessing desirable electrochemical properties with highly reactive anode materials, such as lithium, sodium and the like, and the efficient use of high energy density cathode materials, such as manganese dioxide. The use of aqueous electrolytes is precluded in these systems since the anode materials are sufficiently active to react with water chemically. It has therefore been necessary, in order to realize the high energy density obtainable through use of these highly reactive anodes and high energy density cathodes, to turn to the investigation of nonaqueous electrolyte systems and more particularly to nonaqueous organic electrolyte systems.

The term "nonaqueous organic electrolyte" in the prior art refers to an electrolyte which is composed of a solute, for example, a salt or complex salt of Group I-A, Group II-A or Group III-A elements of the Periodic Table, dissolved in an appropriate nonaqueous organic solvent. Conventional solvents include propylene carbonate, ethylene carbonate or y-butyrolactone. The term "Periodic Table" as used herein refers to the Periodic Table of the Elements as set forth on the inside back cover of the Handbook of Chemistry and Physics, 48th Edition, the Chemical Rubber Co., Cleveland, Ohio, 1967-1968.

Although manganese dioxide has been mentioned as a cathode for cell applications, manganese dioxide inherently contains an unacceptable amount of water, both of the absorbed and bound (adsorbed) types, which is sufficient to cause anode (lithium) corrosion along with its associated hydrogen evolution. This type of corrosion that causes gas evolution is a serious problem in sealed cells, particularly in miniature type button cells. In order to maintain overall battery-powered electronic devices as compact as possible, the electronic devices are usually designed with cavities to accommodate the miniature cells as their power source. The cavities are usually made so that a cell can be snugly positioned therein, thus making electronic contact with appropriate terminals within the device. A major potential problem in the use of cell-powered devices of this nature is that if the gas evolution causes the cell to bulge then the cell could become wedged within the cavity. This could result in damage to the device. Also, if electrolyte leaks from the cell it could cause damage to the device. Thus it is important that the physical dimensions of the cell's housing remain constant during discharge and that the cell will not leak any electrolyte into the device being powered.

U.S. Pat. No. 4,133,856 discloses a process of producing an $MnO_2$ electrode (cathode) for nonaqueous cells whereby the $MnO_2$ is initially heated within a range of 350° to 430° C. so as to substantially remove both the absorbed and bound water and then, after being formed into an electrode with a conductive agent and binder, it is further heated in a range of 200° to 350° C. prior to its assembly into a cell. British Pat. No. 1,199,426 also discloses the heat treatment of $MnO_2$ in air at 250° to 450° C. to substantially remove its water component.

It has been found that heat-treated manganese dioxide has an affinity for absorbing water and thus after the water has been substantially removed, it is necessary to take precautions to insure that the manganese dioxide will not absorb moisture from the environment prior to its use as an active material for electrochemical cells.

It is an object of the present invention to provide a homogeneous mass of particulate manganese dioxide that will have a reduced capacity for moisture absorption when exposed to a moisture environment for a fixed time period.

It is another object of the present invention to provide a homogeneous mass of particulate manganese dioxide that has its pores substantially filled with an organic solvent.

It is another object of the present invention to provide a treatment for heat-treated manganese dioxide so as to decrease its affinity or propensity for absorbing moisture.

It is another object of the present invention to employ a homogeneous mass of particulate manganese dioxide that has been treated with an organic solvent as an active material for electrochemical cells, such as nonaqueous cells.

The foregoing and additional objects will become more fully apparent from the following description.

SUMMARY OF THE INVENTION

The invention relates to a homogeneous mass of particulate manganese dioxide having a moisture content of less than about 300 parts per million (ppm), preferably less than about 200 parts per million, and most preferably less than about 100 parts per million, and wherein the majority of the pores of the manganese dioxide is substantially filled with at least one organic solvent such that when the manganese dioxide is exposed for a period of 30 minutes in an environment having a relative humidity of 8% at 20° C., the manganese dioxide will have a total moisture content of less than about 700 parts per million, preferably less than about 600 parts per million, and most preferably less than about 500 parts per million.

The invention also relates to a method for producing manganese dioxide suitable for use as an active cathode material for electrochemical cells, such as nonaqueous cells, comprising the steps:

(a) removing the moisture content from particulate manganese dioxide to less than about 300 parts per million, preferably about 200 parts per million and most preferably about 100 parts per million, and (b) contacting the particulate manganese dioxide with an organic solvent such that the solvent substantially fills a majority of the pores of the manganese dioxide so that when the particulate manganese dioxide is exposed for a period of 30 minutes in an environment having a relative humidity of 8% at 20° C, the manganese dioxide will have a total moisture content of less than about 700 parts per million, preferably less than about 600 ppm, and most preferably less than about 500 ppm.

As used herein, the substantial filling of the pores shall mean at least the substantial coating of the surface of the pores so as to effectively inhibit any moisture reabsorption.

The solvent-treated manganese dioxide of this invention is ideally suited for use as an active cathode material in electrochemical cells, such as nonaqueous cells.

Particulate manganese dioxide suitable for use in this invention could be manganese dioxide having a majority (over 85%) of its particles sized about 100 microns or lower. This will effectively provide an overall large surface area (usually 40 to 50 $m^2/g$) over which the organic solvent can be deposited for substantially filling the pores in the manganese dioxide. By having the majority of the pores substantially filled with an organic solvent, the particulate manganese dioxide can be handled and transported in a moisture-containing environment for a limited time period whereupon moisture reabsorption will be greatly reduced over untreated manganese dioxide. This will facilitate the assembly of the organic solvent-treated manganese dioxide into cells without the need for expensive and cumbersome moisturefree equipment.

The moisture in conventional grades of particulate manganese dioxide is usually above 15,000 parts per million and can be substantially removed by heating it at an elevated temperature for a period of time sufficient to drive off the moisture. For example, particulate manganese dioxide can be heated at between about 200° C. and 430° C. for a period between about 3 hours and about 9 hours to reduce its moisture content to less then about 300 parts per million. Alternatively, the particulate manganese dioxide can be subjected to a vacuum at an elevated temperature, whereupon the moisture could be withdrawn to the level recited above. It has been observed that when heat-treated manganese dioxide is exposed to a relative humidity of 8% at 20° C. for 30 minutes, the moisture content increases to above 1300 parts per million.

The organic solvent suitable for use in this invention should have a relatively low vapor pressure, i.e., a relatively high boiling point, such that the solvent will remain in the capillary spaces or pores in the manganese dioxide and any moisture reabsorbed will be restricted to only the superficial surface of the manganese dioxide. The organic solvent could be a single solvent such as γ-butyrolactone (GBL), propylene carbonate (PC), dimethoxyethane (DME), tetrahydrofuran (THF), 3-methyl-2-oxazolidone (3Me2Ox), or the like, or mixtures and combinations of solvents. When the treated particulate manganese dioxide is intended for use in a particular cell system, then it is within the scope of this invention to use the organic electrolyte solution as the organic solvent. Thus an organic electrolyte could be employed to substantially fill the pores of a moisture-reduced manganese dioxide to yield a particulate mass of manganese dioxide that can be used in conventional machinery to produce cathodes for nonaqueous cell systems. Generally the particulate mass of organic-treated manganese dioxide will have a bulk density of about 1.5 grams per cubic centimeter or less. This manganese dioxide can then be fabricated into an electrode along with a binder and conductive agent by being compressed in a conventional manner such that the bulk density increases to about 35 to 50 grams per cubic inch (2.1 to 3.1 grams per cubic centimeter) while insuring that the porosity is sufficient to permit the cell's electrolyte to permeate through the electrode. Preferably the finished electrode should have a porosity with between about 20 and 40 percent interconnected voids for providing increased access for the electrolyte.

The conductive agent to be employed could comprise carbon and/or graphite. To impart cohesive characteristics to the electrode, a suitable binder material, with or without plasticizers and with or without stabilizers, should be added. Suitable binder materials may include Portland cement, or resins such as polyvinyl, polyethylene, polypropylene, polyacrylics, polystyrene and the like with polytetrafluoroethylene being the preferred. Preferably, the binder can vary between about 1% and about 8% by weight of the finished electrode.

The solvent treatment of this invention can comprise the heating of particulate manganese dioxide at 350° C. in air for 8 hours to reduce its moisture content to less than about 300 parts per million. Thereafter, about 50 grams of the heat-treated manganese dioxide is placed in a container with about 5 cc of a solvent such as propylene carbonate and then mixed with a metal spatula. The sealed container can then be heated to about 80° C. for 1 hour to vaporize the solvent whereupon cooling the mixture gradually to ambient temperature (20° C.) would cause the solvent to condense into the pores and cavities of the particulate manganese dioxide. The solvent-treated, moisture-reduced particulate manganese dioxide can be molded along with a conductive agent and binder to produce an electrode admirably suited for nonaqueous cell systems. The organic vapor absorption in the pores and cavities of the manganese dioxide can be done at room temperature (20° C.) but preferably it is easier to vaporize the solvent at elevated temperatures (50° C. to 80° C.).

The present invention will become apparent from the following examples.

EXAMPLE 1

Electrolytic particulate manganese dioxide was heat-treated at 350° C. overnight (about 16 hours) whereupon its water content was reduced to 174 parts per million. The water content for this test was determined by mixing about 0.8 g. of the manganese dioxide with about 3 cc of an organic solvent and then shaking the mixture once every hour for 5 to 6 hours whereupon the mixture was allowed to stand until the particulate manganese dioxide settled to the bottom. In the shaking, water contained in the manganese dioxide was transferred to the organic solvent. Thereafter, one cc of the solvent was removed and measured for water content using an Aquatest IV analyzer manufactured by Photovolt Corporation, New York, New York.

Ten-gram samples of the heat-treated manganese dioxide were mixed with various amounts of the organic solvent, γ-butyrolactone (GBL) or propylene carbonate (PC). Specifically, heat-treated manganese dioxide was heated to 80° C. in a container and then the solvent was added and throughly mixed by shaking the mixture in the sealed container several times. The mixture was thereafter cooled to 20° C. and then one gram of each of several solvent-treated, heat-treated manganese dioxide samples was tested for water content while several samples were exposed to air (relative humidity of about 8% at 20° C.) for 30 minutes and then tested for water content as described above. The data so obtained are presented in Table 1.

TABLE I

| MnO₂ Samples | Solvent | Solvent/ 10g MnO₂ | Exposure Time (min.) | H₂O in MnO₂ (ppm) |
|---|---|---|---|---|
| 1 | None | None | *0 | 174 |
| 2 | None | None | 30 | 1310 |
| 3 | GBL | 0.5 (cc) | *0 | 22 |
| 4 | GBL | 0.5 (cc) | 30 | 478 |
| 5 | GBL | 1.0 (cc) | *0 | 42 |
| 6 | GBL | 1.0 (cc) | 30 | 435 |
| 7 | GBL | 1.5 (cc) | *0 | 62 |
| 8 | GBL | 1.5 (cc) | 30 | 412 |
| 9 | PC | 0.5 (cc) | *0 | 15 |
| 10 | PC | 0.5 (cc) | 30 | 448 |
| 11 | PC | 1.0 (cc) | *0 | 15 |
| 12 | PC | 1.0 (cc) | 30 | 378 |
| 13 | PC | 1.5 (cc) | *0 | 24 |
| 14 | PC | 1.5 (cc) | 30 | 443 |

*Zero exposure time refers to samples which were not deliberately exposed to air except for the short period (e.g., about 2 to 3 minutes) required to transfer the sample for weighing and testing.

From the data presented in Table I, it is evident that the solvent-treated samples absorbed substantially less water when exposed to the air than the heat-treated control samples (1 and 2). These data clearly show that the solvent-treated manganese dioxide of this invention would be ideally suited for use as an active cathode material for nonaqueous cell systems.

EXAMPLE 2

Electrolytic manganese dioxide obtained from Japan Metals and Chemical Company was heated in air at 350° C. overnight (about 15 hours). Fifty-gram samples of the purchased manganese dioxide and the heat-treated manganese dioxide were each added to 5 cc of various solvents and mixed in a container with a metal spatula. The container was sealed and then heated at 80° C. for 3 hours whereupon the mixture was then cooled to 20° C. In this process, the organic solvent vaporized and then condensed into any open pores and cavities in the particulate manganese dioxide. As stated above, the solvent could be an electrolyte solution and, therefore, one of the solvents was a solution of 1.0 M LiCF₃SO₃ in 40% dioxane, 30% dimethoxyethane and 30% 3-methyl-2-oxazolidone.

Some of the samples of heat-treated manganese dioxide were placed in the organic solvent without taking the steps to have the solvent condense into the pores and the cavities of the manganese dioxide. Specifically, the heat-treated manganese dioxide, whether exposed to air or not, was put into the organic solvent and then the water content of the manganese dioxide was determined as discussed above whereby a sample of the solvent was analyzed.

Samples of the as-purchased and heat-treated manganese dioxide, whether or not exposed to the air for various time periods, and whether or not the solvent substantially filled the pores and cavities of the manganese dioxide, were tested as described above to determine their water content. The data so obtained are shown in Table II.

The data shown in Table II demonstrate that the filling of pores of heat-treated manganese dioxide with an organic solvent will greatly reduce moisture pickup by the treated manganese dioxide when exposed to a moisture environment for a limited time period. The treated manganese dioxide of this invention can be combined with a conductive agent and binder to produce cathodes that can easily and efficiently be handled for assembly in nonaqueous type cell systems.

It is to be understood that other modifications and changes to the preferred embodiment of the invention herein shown and described can also be made without departing from the spirit and scope of the invention.

Table 2

| Test Sample | Solvent | MnO₂ | [5]Exposure | H₂O (ppm) |
|---|---|---|---|---|
| 1. | [1]Electrolyte | None | 0 | 46 |
| 2. | [1]Electrolyte | None | 3 min. | 159 |
| 3. | [1]Electrolyte | [2]Yes | 0 | 254 |
| 4. | [1]Electrolyte | [2]Yes | 20 min. | 934 |
| 5. | [1]Electrolyte | [2]Yes | 60 min. | 1201 |
| 6. | [1]Electrolyte | [3]Yes | 0 | 188 |
| 7. | [1]Electrolyte | [3]Yes | 20 min. | 501 |
| 8. | [1]Electrolyte | [3]Yes | 60 min. | 531 |
| 9. | GBL | [4]Yes | 0 | 1360 |
| 10. | PC | [4]Yes | 0 | 701 |
| 11. | GBL | None | 0 | 0 |
| 12. | PC | None | 0 | 9 |
| 13. | GBL | None | 0 | 9 |
| 14. | PC | None | 0 | 4 |
| 15. | GBL | None | 3 min. | 11 |
| 16. | PC | None | 3 min. | 18 |
| 17. | GBL | [2]Yes | 0 | 178 |
| 18. | GBL | [2]Yes | 20 min. | 970 |
| 19. | GBL | [2]Yes | 60 min. | 1115 |
| 20. | PC | [3]Yes | 0 | 33 |
| 21. | PC | [3]Yes | 20 min. | 271 |
| 22. | PC | [3]Yes | 60 min. | 322 |

Footnotes
[1]1.0 M Li CF₃SO₃ in 40% dioxolane, 30% dimethoxyethane and 30% 3-methyl-2-oxazolidone.
[2]Heat-treated MnO₂ placed in the solvent without having the solvent vaporized to fill the pores of the MnO₂.
[3]Heat-treated MnO₂ placed in the solvent and heated as discussed in Example 2 to vaporize the solvent whereupon the solvent substantially filled the pores of the MnO₂.
[4]MnO₂ not heat-treated.
[5]Exposed to a relative humidity of 5 to 10% at 20° C.

What is claimed is:

1. A method for assembling a nonaqueous cell employing a manganese dioxide-containing cathode comprising the steps:
   removing the moisture content from particulate manganese dioxide to less than 300 parts per million;
   (b) contacting the particulate manganese dioxide with at least one organic solvent such that the solvent substantially fills a majority of the pores of the manganese dioxide.
   (c) blending the solvent treated manganese dioxide with a conductive agent and a binder to form a manganese dioxide-containing cathode; and
   (d) assembling the solvent-treated manganese dioxide-containing cathode into a cell along with an anode and an electrolyte solution.

2. The method of claim 1 wherein in step (a) the particulate manganese dioxide is heated between about 200° C. and about 430° C. for about 3 hours.

3. The method of claim 1 or 2 wherein in step (b) the at least one solvent is mixed with the particulate manganese dioxide and heated to between about 50° C. and 80° C. and then cooled to 20° C.

4. The method of claim 2 wherein after step (c) the solvent-treated manganese dioxide-containing cathode is transported in a moisture-containing environment to a cell assembly location.

5. The method of claim 1 wherein the organic solvent is selected from the group consisting of γ-butyrolactone, propylene carbonate, dimethoxyethane, tetrahydrofuran and 3-methyl-2-oxazolidone.

* * * * *

UNITED STATES PATENT AND TRADEMARK OFFICE
CERTIFICATE OF CORRECTION

PATENT NO. : 4,285,122
DATED : August 25, 1981
INVENTOR(S) : A. Kozawa

It is certified that error appears in the above—identified patent and that said Letters Patent is hereby corrected as shown below:

Column 6, line 41, before the word "removing" add --(a)--.

Signed and Sealed this

Ninth Day of February 1982

[SEAL]

Attest:

GERALD J. MOSSINGHOFF

Attesting Officer        Commissioner of Patents and Trademarks